United States Patent [19]
Oto

[11] Patent Number: 5,442,773
[45] Date of Patent: Aug. 15, 1995

[54] INSTRUCTION CONTROL METHOD AND INSTRUCTION CONTROL APPARATUS

[75] Inventor: Takeshi Oto, Kanagawa, Japan

[73] Assignee: Kabushiki Kaisha Toshiba, Kawasaki, Japan

[21] Appl. No.: 846,937

[22] Filed: Mar. 6, 1992

[30] Foreign Application Priority Data

Mar. 14, 1991 [JP] Japan ................... 3-049813

[51] Int. Cl.⁶ .................... G06F 9/28; G06F 13/00
[52] U.S. Cl. .................... 395/550; 395/375; 364/232.8; 364/260; 364/262.8; 364/271; 364/DIG. 1
[58] Field of Search ................... 395/375, 550

[56] References Cited

U.S. PATENT DOCUMENTS

| | | | |
|---|---|---|---|
| 4,254,475 | 3/1981 | Cooney et al. | 395/550 |
| 4,386,401 | 5/1983 | O'Brien | 395/550 |
| 4,893,271 | 1/1990 | Davis et al. | 395/550 |
| 5,086,500 | 2/1992 | Greub | 395/550 |

Primary Examiner—Parshotam S. Lall
Assistant Examiner—Ayni Mohamed
Attorney, Agent, or Firm—Oblon, Spivak, McClelland, Maier, & Neustadt

[57] ABSTRACT

An instruction control method for controlling instructions executed in an internal circuit in synchronization with a high frequency clock signal consists of the steps of storing in a specific instruction phase information designating a specific phase of the low frequency clock signal with which a data signal transferred between the internal circuit and an external circuit is synchronized, deferring the execution of the specific instruction until the phase of the low frequency clock signal agrees with the specific phase designated by the phase information in the specific instruction after an instruction prefixed to the specific instruction is executed, and executing the specific instruction in the internal circuit in synchronization with the high frequency clock signal when the phase of the low frequency clock signal agrees with the specific phase designated by the phase information in the specific instruction.

16 Claims, 11 Drawing Sheets

INSTRUCTION CONTROL METHOD AND INSTRUCTION CONTROL APPARATUS

BACKGROUND OF THE INVENTION

1. Field of the Invention

The present invention relates to an instruction control method for controlling the execution of instructions in a processor in which the frequency of an internal clock signal differs from the frequency of an external clock signal by which input and output data are synchronized, and to an instruction control apparatus for implementing the instruction control method, 2. Description of Background Conventionally, large scale integrated circuit processors controlled by machine instruction are well known. Recently, because the calculation speed in the processor has been improved as transistors are largely integrated in the processor, the frequency of an internal clock signal by which micro instructions are synchronized in an integrated circuit has been increased. For example, the frequency of the internal clock signal has reached tens of millions and a further increase in the frequency is expected in the future.

However, a board attached the integrated circuits is comparatively large although the circuits are miniaturized. Therefore, a load capacitance such as the electric capacitance of a condenser arranged on the board remains large. In other words, data signals which are synchronized with external clock signals are transmitted among the integrated circuits at a low speed in the board. Therefore, the difference in the transmission speed of the data signals between the outside of the integrated circuit and the integrated circuit has increased as the integrated circuit is miniaturized.

In cases where the circuit is not largely integrated, the difference in the transmission speed of the data signals between the outside of the integrated circuit and the integrated circuit is comparatively small so that the external clock signal utilized outside the integrated circuits is provided to the integrated circuits to be utilized as the internal clock signal without shifting the frequency of this external clock signal. In other words, the data signals in the integrated circuits and those outside the circuits are synchronized with the same clock signal.

However, the circuit has been miniaturized and largely integrated so that the data signals in the integrated circuit are transmitted at high speed. Therefore, the data signals can be synchronized with a high frequency clock signal with a higher frequency than that of the external clock signal transmitted among the integrated circuits in the board. Accordingly, it is impractical to synchronize the data signals in the integrated circuits and those outside the circuits with the same clock signal.

To solve the above drawback, a clock system 11 shown in FIG. 1 has recently been utilized.

FIG. 1 is a block diagram of an integrated circuit operating in synchronization with high and low frequency clock signals. The high frequency clock signal is utilized as the internal clock signal and the low frequency clock signal is utilized as the external clock signal.

As shown in FIG. 1, an integrated circuit 11 comprises an integrated internal circuit 12 in which internal signals synchronized with the high frequency clock signal are transmitted and an input/output circuit 13 for providing an input signal provided from outside the integrated internal circuit 12 to the circuit 12 in synchronization with the low frequency clock signal, and for providing an output signal transmitted from the integrated internal circuit 12 to the outside in synchronization with the low frequency clock signal.

In the above configuration, the transference of the input and output signals between the integrated internal circuit 12 and outside the circuit 12 is accomplished while the input and output signals are synchronized with the low frequency clock signal. On the other hand, the operation in the integrated internal circuit 12 is executed while the internal signals are synchronized with the high frequency clock signal.

Therefore, two types of clock signals must be provided to the clock system 11 from outside the integrated internal circuit 12, so that a troublesome wiring design such as a so-called emitter complete logic is required to provide a wire for the high frequency clock signal.

To solve the above drawback, another integrated circuit 21 shown in FIG. 2 has been utilized.

FIG. 2 is a block diagram of the integrated circuit 21 provided with a phase locked loop.

As shown in FIG. 2, the integrated circuit 21 comprises a phase locked loop 22 for generating a high frequency clock signal of which the phase is locked by a low frequency clock signal provided from outside the integrated circuit 21, an integrated internal circuit 23 in which internal signals are transmitted in synchronization with the high frequency clock signal generated in the phase locked loop 22, and the input/output circuit 13.

In the above configuration, because the high frequency clock signal is generated in the phase locked loop 22, a wire transmitting the high frequency clock signal to the outside of the integrated circuit 21 is not required, so that the wiring design of the board is simplified.

However, there are drawbacks in the integrated circuits 11, 21 in cases where a signal synchronized with the high frequency clock signal are output through the input/output circuit 13 in which the signal must be synchronized with the low frequency clock signal.

To describe the drawbacks with reference to FIGS. 3, 4, the frequency of the high frequency clock signal is considered to be four times as large as that of the low frequency clock signal.

FIG. 3 is a block diagram of an integrated circuit 31 typically showing the integrated circuits 11, 21.

External signals are transferred between an integrated internal circuit 32 and the outside of the circuit 32 through an input/output circuit 33.

FIG. 4 is a timing chart showing the phase of the slow frequency clock signal during the execution of an instruction executed in synchronization with the high frequency clock signal, the instruction being executed in the integrated internal circuit 82 shown in FIG. 3.

As shown in FIG. 4, instructions stored in a instruction memory (not shown) of the integrated internal circuit 32 are executed when the high frequency clock signal is at a leading edge thereof, while input/output operation is executed in the input/output circuit 33 when the low frequency clock signal is at a leading edge thereof.

An output operation will first be described. In cases where an instruction for providing output data to the outside of the integrated internal circuit 82 is executed in an execution period of time $T_{12}$, $T_{23}$, or $T_{34}$, the output data promptly appears on an interface signal wire 34 disposed between the integrated internal circuit 32 and the input/output circuit 33. However, because the appearance time of the output data does not agree with the leading edge of the low frequency clock signal at a first cycle (1) of the low frequency clock signal, the output data is abandoned without being received in a flip-flop 35 of the input/output circuit 33. On the other hand, in cases where the output instruction is executed in an execution period of time $T_{45}$, the output data promptly appearing on the interface signal wire 84 is provided to the outside of the integrated internal circuit 82 through the flip-flop 85 and an external signal wire 36 at a second cycle (2) of the low frequency clock signal because the appearance of the output data agrees with the leading edge of the low frequency clock signal at a time $T_5$.

Therefore, the output data can be provided to the outside only when the output instruction is executed in a specific execution time period such as the period $T_{45}$.

An input operation will next be described. In cases where an instruction for receiving input data from outside the integrated internal circuit 32 is executed in an execution time period $T_{56}$, the first input data appearing on the interface signal wire 34 at the first cycle (1) of the low frequency clock signal is provided to the integrated internal circuit 32 through an internal signal wire 37. On the other hand, in cases where the input instruction is executed in execution time periods $T_{67}$, $T_{78}$, or $T_{89}$, the second input data appearing on the interface signal wire 34 at the second cycle (2) of the low frequency clock signal is provided to the integrated internal circuit 32 through the internal signal wire 37.

Therefore, the input data cannot be specified because either the first or second input data is provided to the circuit 32 according to the execution time.

That is, in cases where the phase of the slow frequency clock signal in a first execution time differs from that in a second execution time, one operation executed in the first execution time differs from another operation executed in the second execution time regardless of the execution of the same instruction in the input or output operation.

In the above case, the operation expected by a programmer can be executed in cases where the phase of the slow frequency clock signal at an execution time of a top instruction first executed in a program including input and output instructions can be expected, and the program is drawn up while counting the number of execution steps for all instructions. However, in cases where the program is utilized many times as a subroutine in a large main program, the programmer cannot predict the phase of the slow frequency clock signal when the top instruction in the program is executed. Therefore, the operations of the input and output instructions differ from the operations expected by the programmer.

Moreover, in cases where the high frequency clock signal is generated by the phase locked loop 22 as shown in FIG. 2, because a lead-in time corresponding to the necessary time for generating the high frequency clock signal in the phase locked loop depends on the frequencies of both the high and low frequency clock signals, the leadin time is not constant. Therefore, after the phase locked loop is reset, the time required to generate the high frequency clock signal and to operate the program is shifted.

Accordingly, it is difficult to know the phase of the low frequency clock system when the top instruction in the program is executed. That is, the operation expected by the programmer cannot be substantially implemented.

SUMMARY OF THE INVENTION

A first object of the present invention is to provide, with due consideration to the drawbacks of such conventional control method, an instruction control method for controlling the execution of input and output instructions in an integrated circuit in which the frequency of an internal clock signal utilized in an internal circuit differs from the frequency of an external clock signal utilized in an external circuit.

A second object is to provide an instruction control apparatus for easily implementing the instruction control method.

The first object is achieved by the provision of an instruction control method for controlling instructions executed in an internal circuit in synchronization with a high frequency clock signal with a frequency larger than that of a low frequency clock signal with which data signals transferred between the internal circuit and an external circuit disposed outside the internal circuit are synchronized, comprising steps of:

storing phase information designating a specific phase of the low frequency clock signal in a specific instruction;

deferring the execution of the specific instruction until the phase of the low frequency clock signal agrees with the specific phase designated by the phase information in the specific instruction after an instruction prefixed to the specific instruction is executed; and executing the specific instruction in the internal circuit in synchronization with the high frequency clock signal when the phase of the low frequency clock signal agrees with the specific phase designated by the phase information in the specific instruction.

In the above steps, regardless of the execution of the instruction prefixed to the specific instruction, the specific instruction is not immediately executed in the internal circuit because the phase information stored in the specific instruction is detected in a prescribed control circuit. In place of the execution of the specific instruction, a no operation (NOP) code is, for example, inserted. The insertion of the NOP code is continued until the phase of the low frequency clock signal agrees with the specific phase designated by the phase information in the specific instruction.

Thereafter, when the phase of the low frequency clock signal agrees with the specific phase designated by the phase information in the specific instruction as time elapses, the specific instruction in the internal circuit is executed in synchronization with the high frequency clock signal.

Accordingly, by storing the phase information designating the specific phase of the low frequency clock signal in the specific instruction, for example, relating to an input or output operation requiring the exchange of data signals between the internal circuit and the external circuit, the operation such as an input or output operation is reliably implemented by executing the specific instruction in synchronization with both the high and low frequency clock signals because the execution time of the specific instruction can be controlled even though the specific instruction is executed many times in a subroutine of a large main program.

The second object is achieved by the provision of an instruction control apparatus for controlling instructions executed in an internal circuit in synchronization with a high frequency clock signal of which the frequency is larger than that of a low frequency clock signal with which a data signal transferred between the internal circuit and an external circuit disposed at outside the internal circuit is synchronized, comprising:

phase information storing means disposed in a specific instruction for storing phase information designating a specific phase of the low frequency clock signal;

instruction memory means for storing a series of instructions including the specific instruction containing the phase information storing means;

instruction registration means for storing an instruction to be executed which is read out from the instruction memory means;

phase detecting means for detecting a phase of the low frequency clock signal at a leading edge of the high frequency clock signal;

instruction and phase information Judging means for judging whether or not the instruction stored in the instruction registration means is the specific instruction containing the phase information storing means and whether or not the phase of the low frequency clock signal detected by the phase detecting means agrees with the specific phase designated by the phase information stored in the phase information storing means;

instruction holding means for holding the instruction stored in the instruction registration means in cases where the instruction and phase information Judging means Judges the instruction to be the specific instruction containing the phase information storing means; and instruction executing means for executing the instruction stored in the instruction registration means in cases where the instruction and phase information judging means judges the instruction not to be the specific instruction containing the phase information storing means and for executing the instruction held in the instruction holding means when the phase of the low frequency clock signal detected by the phase detecting means agrees with the specific phase designated by the phase information stored in the phase information storing means as time elapses in cases where the instruction and phase information Judging means judges the instruction to be the specific instruction containing the phase information storing means.

In the above configuration, a series of instructions executed in synchronization with the high frequency clock signal is stored in the instruction memory means. A specific instruction among these instructions is provided with the phase information storing means to store the phase information. The phase information designates the specific phase of the low frequency clock signal, so that the specific instruction is expected to be executed when the phase of the low frequency clock signal agrees with the specific phase designated by the phase information.

When an instruction stored in the instruction memory means is designated by a prescribed controller to be executed, the designated instruction is stored in the instruction registration means before the instruction is executed. Thereafter, the instruction and phase information judging means Judges whether or not the instruction is the specific instruction. Moreover, information as to the phase of the low frequency clock signal detected by the phase detecting means is transmitted to the instruction and phase information judging means to Judge whether or not the phase of the low frequency clock signal agrees with the specific phase.

In cases where the instruction and phase information judging means Judges that the instruction stored in the instruction registration means is not the specific instruction, the instruction is transferred to the instruction executing means so that the instruction is immediately executed in the internal circuit.

In cases where the instruction and phase information judging means Judges that the instruction stored in the instruction registration means is the specific instruction, the instruction is held in the instruction holding means so that the execution of the instruction is deferred. Thereafter, when the phase of the low frequency clock signal agrees with the specific phase as time elapses, the instruction held in the instruction holding means is transferred to the instruction executing means so that this instruction is executed in the internal circuit.

Accordingly, the execution of the specific instruction can be deferred until the phase of the low frequency clock signal agrees with the specific phase, while instructions other than the specific instruction can be immediately executed. Therefore, the execution time for suitable instructions can be controlled.

DETAILED DESCRIPTION OF THE PREFERRED EMBODIMENTS

Preferred embodiments of an instruction control method according to the present invention are described with reference to FIGS. 5 to 12.

Figure 1:
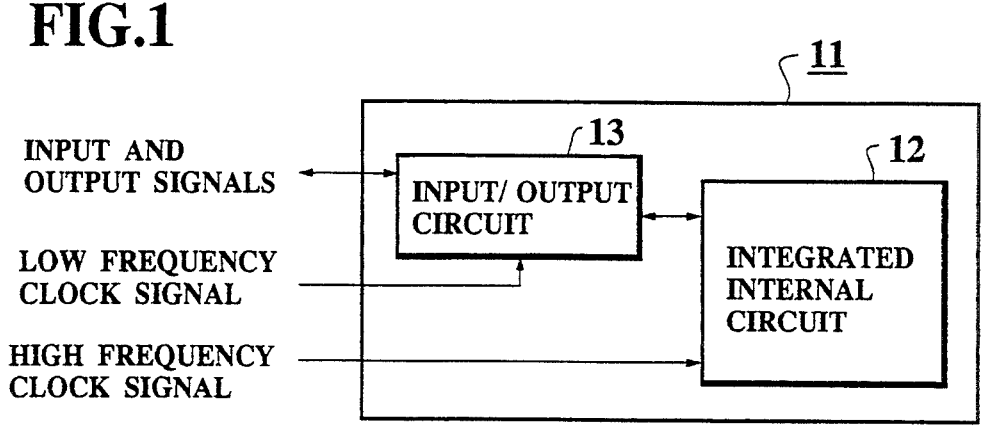
FIG. 1 is a block diagram of a conventional integrated circuit in which both a high frequency clock signal and a low frequency clock signal are utilized.
Figure 2:
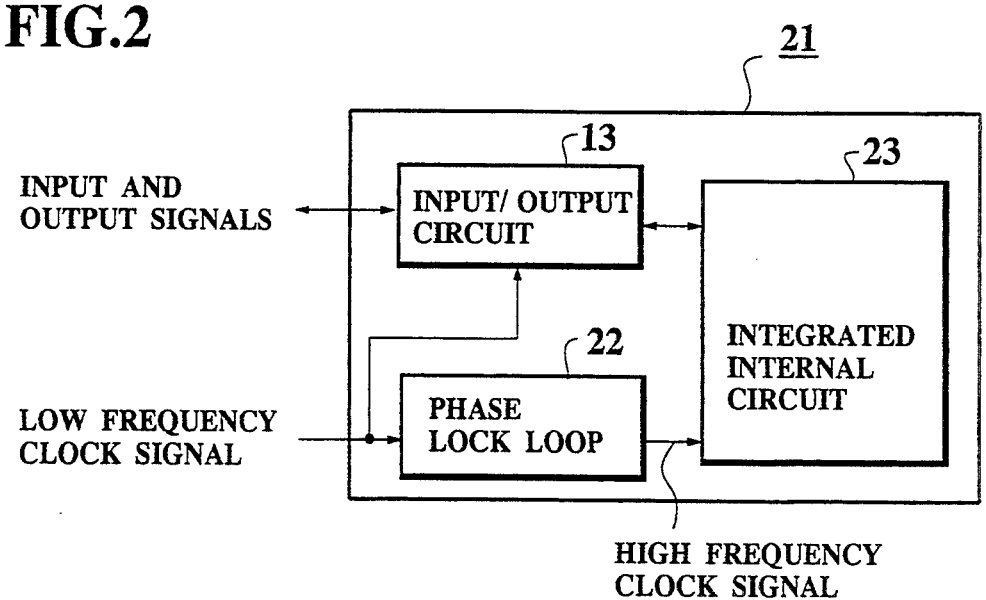
FIG. 2 is a block diagram of another conventional integrated circuit provided with a phase locked loop.
Figure 3:
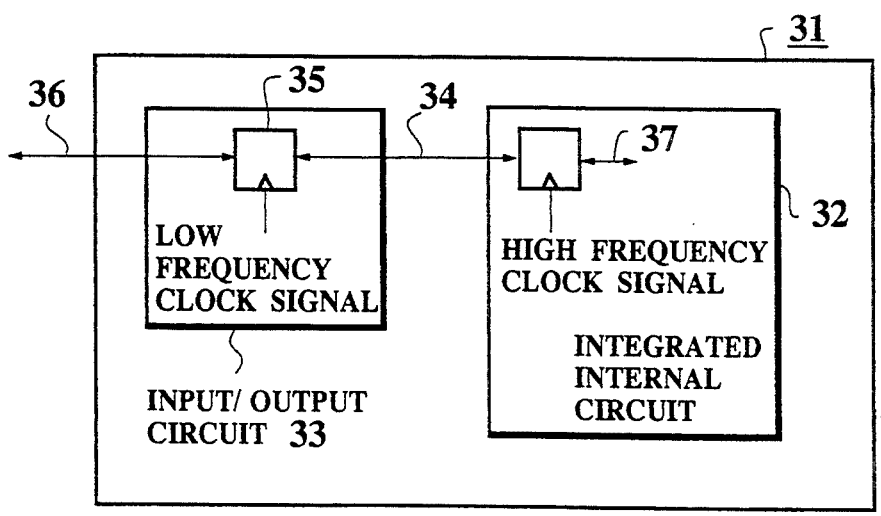
FIG. 3 is a block diagram of a conventional integrated circuit typically showing integrated circuit illustrated in FIGS. 1, 2 in which external signals are transferred between an integrated internal circuit and the outside of the circuit through an input/output circuit.
Figure 4:
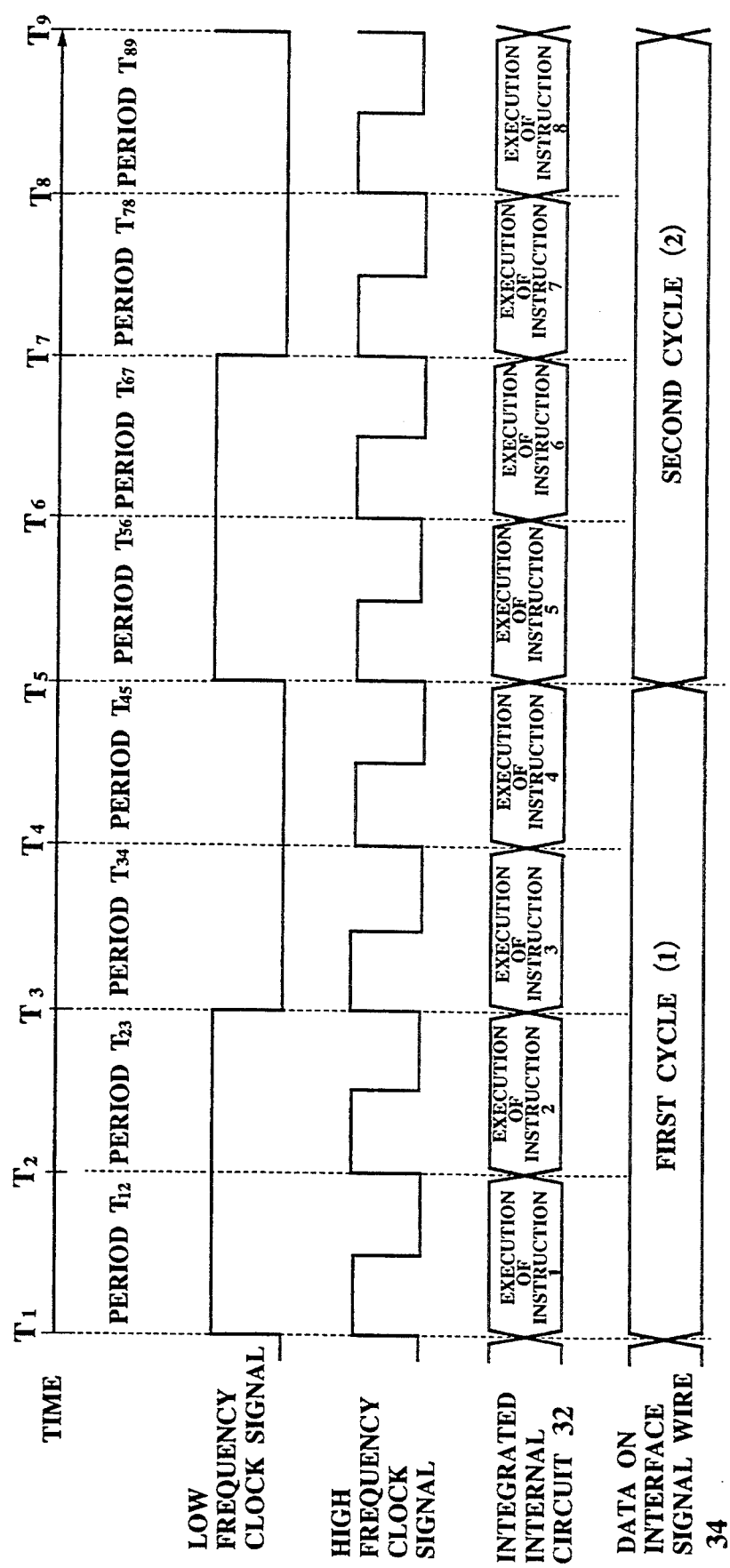
FIG. 4 is a timing chart showing the phase of the low frequency clock signal during the execution of an instruction executed in synchronization with the high frequency clock signal, the instruction being executed in the integrated internal circuit shown in FIG. 3.
Figure 5:
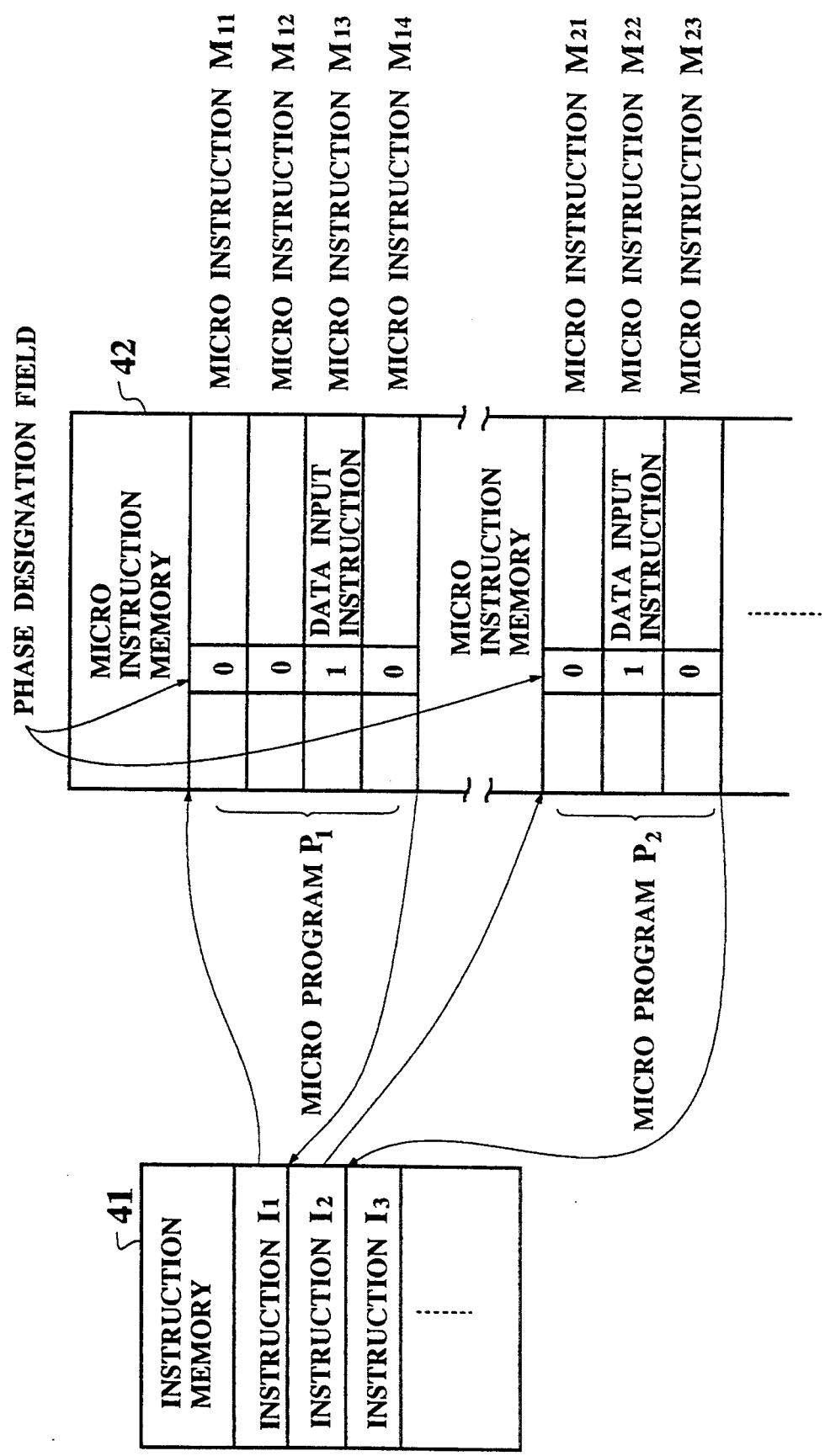
FIG. 5 is a block diagram of both an instruction memory and a micro instruction memory in which the instruction control method according to a first embodiment of the present invention is accomplished.

FIG. 5 is a block diagram of both an instruction memory 41 and a micro instruction memory 42 in which the instruction control method according to a first embodiment of the present invention is implemented.

As is commonly known, instructions stored in the instruction memory are executed in turn to accomplish a prescribed operation under the control of a prescribed control circuit in an integrated internal circuit of an integrated circuit. In this case, a series of micro instructions is executed to designate transmission routes of data signals for each instruction so that the instruction can be smoothly executed. For example, the micro instructions are executed to adjust switches through which the data signals are transmitted in the integrated circuit.

As shown in FIG. 5, a series of instructions $I_1$, $I_2$, $I_3$, - - - is stored in the instruction memory 41 and a series of micro programs $P_1$, $P_2$, $P_3$, - - - is stored in the micro instruction memory 42. Each micro program $P_k$ (k=1, 2, 3, - - - ) corresponds to the instruction $I_k$ so that the micro program $P_k$ is executed when the instruction $I_k$ is executed. Each micro program $P_k$ comprises a series of micro instructions $M_{kn}$ (n=1, 2, 3, - - - ) so that the micro instructions $M_{kn}$ are executed one after another when the micro program $P_k$ is executed.

Therefore, the integrated internal circuit is set up to a condition for executing, for example, the instruction $I_1$ by executing the micro program $P_1$ so that the instruction $I_1$ can be executed.

Figure 6:
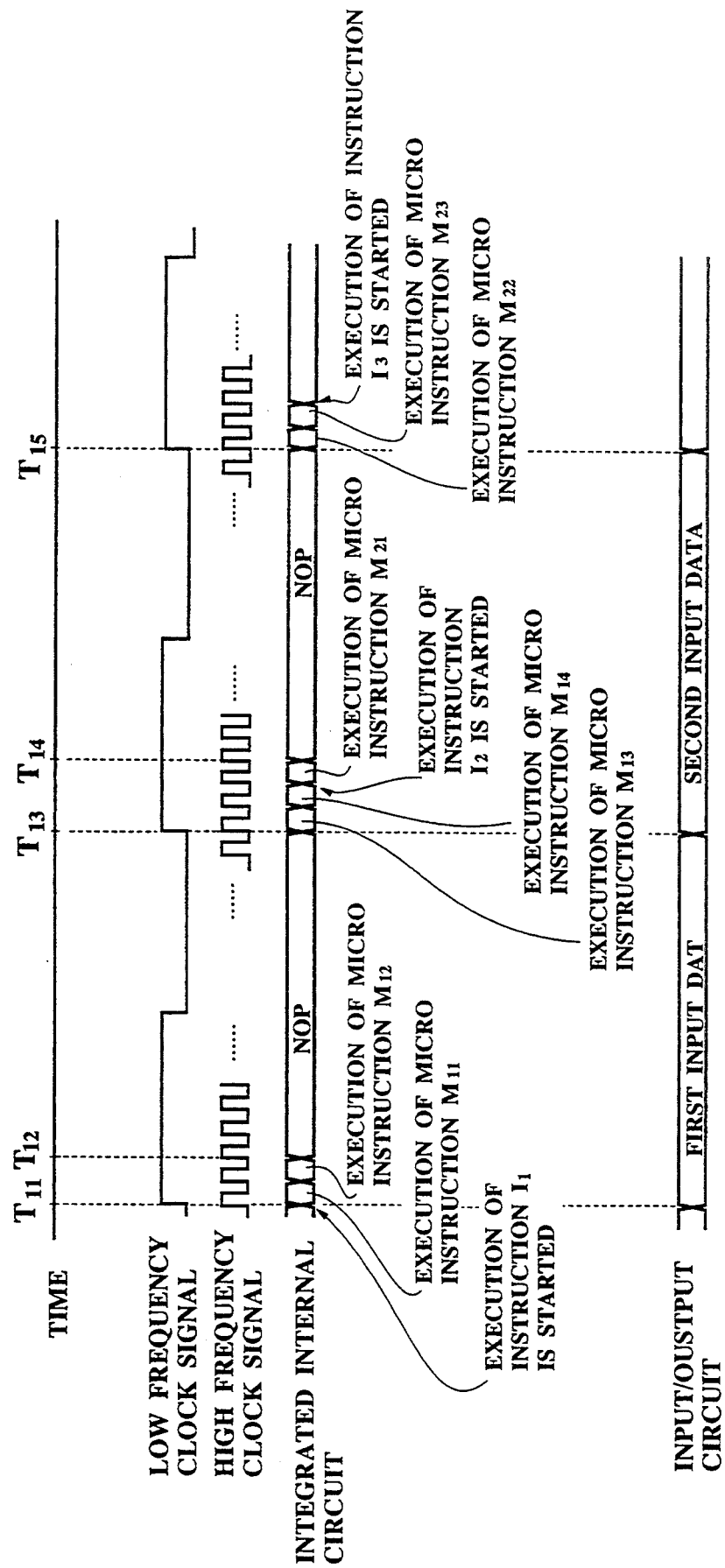
FIG. 6 is a timing chart showing the phase of the slow frequency clock signal during the execution of a micro instruction executed in synchronization with the high frequency clock signal according to the first embodiment of the present invention.

In the instruction control method according to the first embodiment, as shown in FIG. 6, the micro instructions are executed in the integrated internal circuit in synchronization with a high frequency clock signal which is generated from a low frequency clock signal in a phase locked loop (not shown). The execution of the micro instruction is accomplished within one cycle of the high frequency clock signal because the operation implemented by the micro instruction is simple. The high frequency clock signal is synchronized with the low frequency clock signal with a frequency smaller than that of the high frequency clock signal. Specifically, the phase of the high frequency clock signal is locked at the leading edge thereof when the phase of the low frequency clock signal is at the leading edge thereof.

Moreover, each micro instruction is provided with a phase designation field for designating a specific phase of the low frequency clock signal. The phase designation field is formed by one bit. In cases where the specific phase of the low frequency clock signal is designated in a micro instruction, the execution of the micro instruction synchronized with the high frequency clock signal is deferred until the phase of the low frequency clock signal agrees with the specific phase. That is, phase information is designated in the phase designation field in the present invention.

On the other hand, in cases where the specific phase of the low frequency clock signal is not designated in a micro instruction $M_{kn}$, the micro instruction $M_{kn}$ is immediately executed after another micro instruction $M_{kn-1}$ prefixed to the micro instruction $M_{kn}$ is executed. In general, the specific phase of the low frequency clock signal is designated for controlling the execution of instructions in which data transfer between the integrated internal circuit and an integrated external circuit disposed outside the integrated internal circuit is required.

As shown in FIG. 5, the micro instructions $M_{13}$, $M_{22}$ are executed in the micro programs $P_1$, $P_2$ to accomplish an input operation. Therefore, a binary digit "1" is provided in the phase designation field of the micro instructions $M_{13}$, $M_{22}$ to designate the specific phase of the low frequency clock signal. That is, the execution of the micro instructions $M_{13}$, $M_{22}$ is deferred until the phase of the low frequency clock signal agrees with the specific phase. Moreover, a binary digit "0" is provided in the phase designation field of the other micro instructions in which data transfer between the integrated internal circuit and the integrated external circuit is not required. Therefore, other micro instructions provided with a binary digit "0" are immediately executed regardless of the phase of the low frequency clock signal.

FIG. 6 is a timing chart showing the phase of the slow frequency clock signal during the execution of a micro instruction executed in synchronization with the high frequency clock signal according to the first embodiment of the present invention.

In the first embodiment, because the micro instructions $M_{13}$, $M_{22}$ are executed to accomplish an input operation, the specific phase designated in the phase designation field corresponds to the leading edge.

As shown in FIG. 6, after the execution of the instruction $I_1$ is initially started at a time $T_{11}$, the micro instructions $M_{11}$, $M_{12}$ are executed. After the execution of the micro instructions $M_{11}$, $M_{12}$ is accomplished at a time $T_{12}$, a NOP code is inserted because a binary digit "1" is provided in the phase designation field of the micro instruction $M_{13}$ and the low frequency clock signal is not at the leading edge thereof. Therefore, the execution of the micro instruction $M_{13}$ is deferred. Thereafter, when the leading edge of the high frequency clock signal agrees with the leading edge of the low frequency clock signal at a time $T_{13}$, the insertion of the NOP code is suspended so that the micro instruction $M_{13}$ is executed.

On the other hand, a first unit of input data is transmitted to an input/output circuit (not shown) from the integrated external circuit in synchronization with the low frequency clock signal so that the first input data is provided at the time $T_{13}$ in the input/output circuit. Therefore, the first input data is fetched in the integrated internal circuit by the execution of the micro instruction $M_{13}$.

After the execution of the micro instruction $M_{13}$ is accomplished, the micro instruction $M_{14}$ is then executed because a binary digit "0" is provided in the phase designation field of the micro instruction $M_{14}$.

Thereafter, the execution of the instruction $I_2$ is started so that the micro instruction $M_{21}$ is executed. After the execution of the micro instructions $M_{21}$ is accomplished at a time $T_{14}$, NOP code is inserted because a binary digit "1" is provided in the phase designation field of the micro instruction $M_{22}$ and the low frequency clock signal is not at the leading edge thereof. Therefore, the execution of the micro instruction $M_{22}$ is deferred. Thereafter, when the leading edge of the high frequency clock signal agrees with the leading edge of the low frequency clock signal at a time $T_{15}$, the insertion of the NOP code is suspended so that the micro instruction $M_{22}$ is executed.

Therefore, a second unit of input data transmitted to the input/output circuit from the integrated external circuit is fetched in the integrated internal circuit by the execution of the micro instruction $M_{22}$ in the same manner as the first input data.

Thereafter, the execution of the instruction $I_3$ is started.

Figure 7:
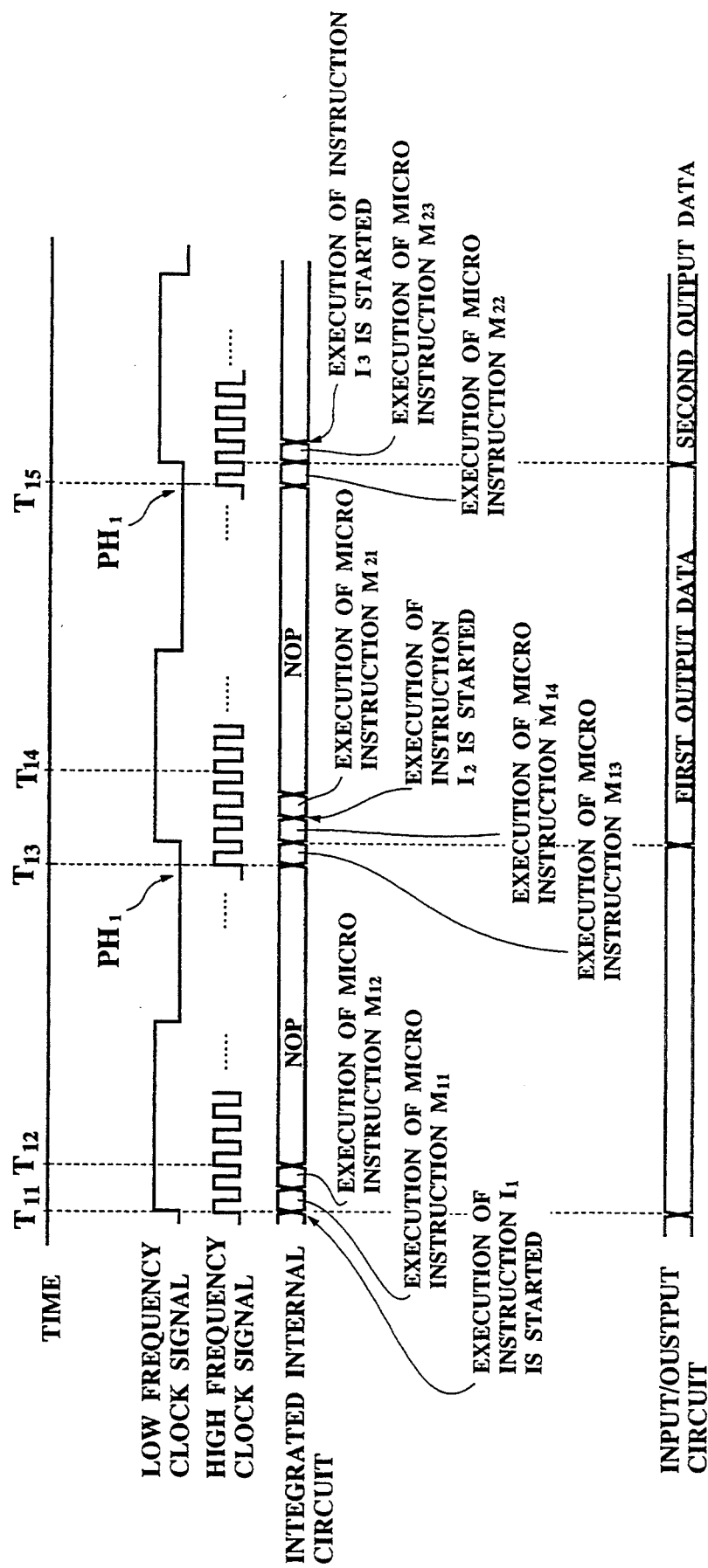
FIG. 7 is a timing chart showing the phase of the slow frequency clock signal during the execution of a micro instruction executed in synchronization with the high frequency clock signal according to a modified case of the first embodiment of the present invention.

In cases where the micro instructions $M_{13}$, $M_{22}$ are executed to accomplish an output operation, as shown in FIG. 7, the specific phase designated in the phase designation field is a phase $PH_1$ corresponding to the final leading edge in high frequency clock pulses which are positioned in one cycle of the low frequency clock signal.

Therefore, when the execution of either the micro instruction $M_{13}$ or $M_{22}$ is accomplished, output data is transferred from the integrated internal circuit to the input/output circuit in synchronization with the low frequency clock signal.

Accordingly, in cases where a micro program consisting of a series of micro instructions is drawn up in the micro instruction memory 42, because the micro instructions requiring data transfer between the integrated internal and external circuits through the input/output circuit are provided with a binary digit "1" in the phase designation field thereof and the other micro instructions requiring no data transfer are provided with a binary digit "0" in the phase designation field thereof, the execution of the micro instructions requiring data transfer is deferred until the phase of the low frequency clock signal agrees with the specific phase.

Therefore, data transfer between the integrated internal and external circuits through the input/output circuit can be reliably accomplished although the micro instructions requiring the data transfer are executed many times in a subroutine of a large main program.

In general, the instruction memory 41 is formed by either a RAM or a ROM. In cases where the instruction memory 41 is formed by a ROM, the instructions stored in the instruction memory 41 cannot be altered so that the instructions executed in the integrated internal circuit are predetermined. In cases where the instruction memory 41 is formed by a RAM, the instructions stored in the instruction memory 41 can be altered. The micro instruction memory 42 is formed by a ROM so that the micro instruction executed in the integrated internal circuit are predetermined.

In the first embodiment, when the leading edge of the high frequency clock signal agrees with the leading edge of the low frequency clock signal, the micro instructions requiring the data transfer between the integrated internal and external circuits through the input/output circuit are allowed to be executed. However, the specific phase of the low frequency clock signal is not limited to the above embodiment. That is, it is preferable that a micro instruction be designated for executing when the phase of the low frequency clock signal agrees with a suitable phase corresponding to the operation executed by the micro instruction.

Next, an instruction control method according to a second embodiment of the present invention is described.

Figure 8:
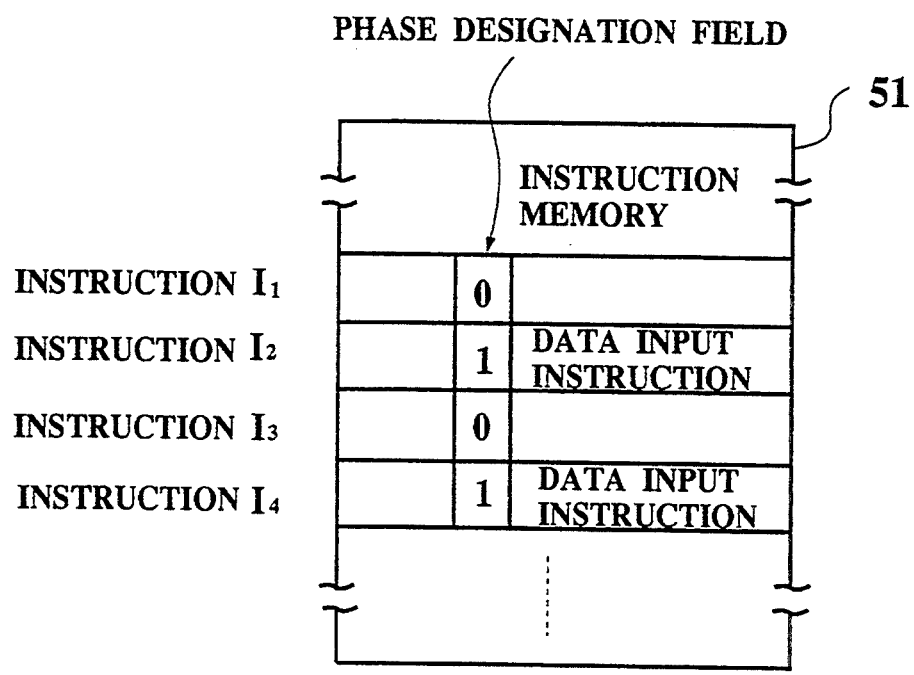
FIG. 8 shows an instruction memory formed in RAM according to a second embodiment of the present.

FIG. 8 shows an instruction memory formed by a RAM according to the second embodiment of the present invention.

As shown in FIG. 8, a series of instructions $I_1$, $I_2$, - - - is stored in an instruction memory 51. Each instruction is provided with a phase designation field for designating a specific phase of the low frequency clock signal in the second embodiment, while each micro instruction is provided with the phase designation field in the first embodiment. The phase designation field is formed as one bit in the same manner as in the first embodiment.

In an integrated circuit operated by the execution of the instructions according to the second embodiment, a high speed operation is required so that the integrated circuit directly sets up data transmission routes thereof by the execution of the instructions without utilizing micro instructions.

In the second embodiment, the instructions $I_2$, $I_4$ are designated by a binary digit "1" in the phase designation field thereof to fetch input data in the integrated internal circuit from the integrated external circuit. Therefore, the execution of the instructions $I_2$, $I_4$ is deferred until the phase of the low frequency clock signal agrees with the leading edge in the same manner as in the first embodiment. Moreover, each instruction is executed within several clock pulses in the high frequency clock signal.

Figure 9:
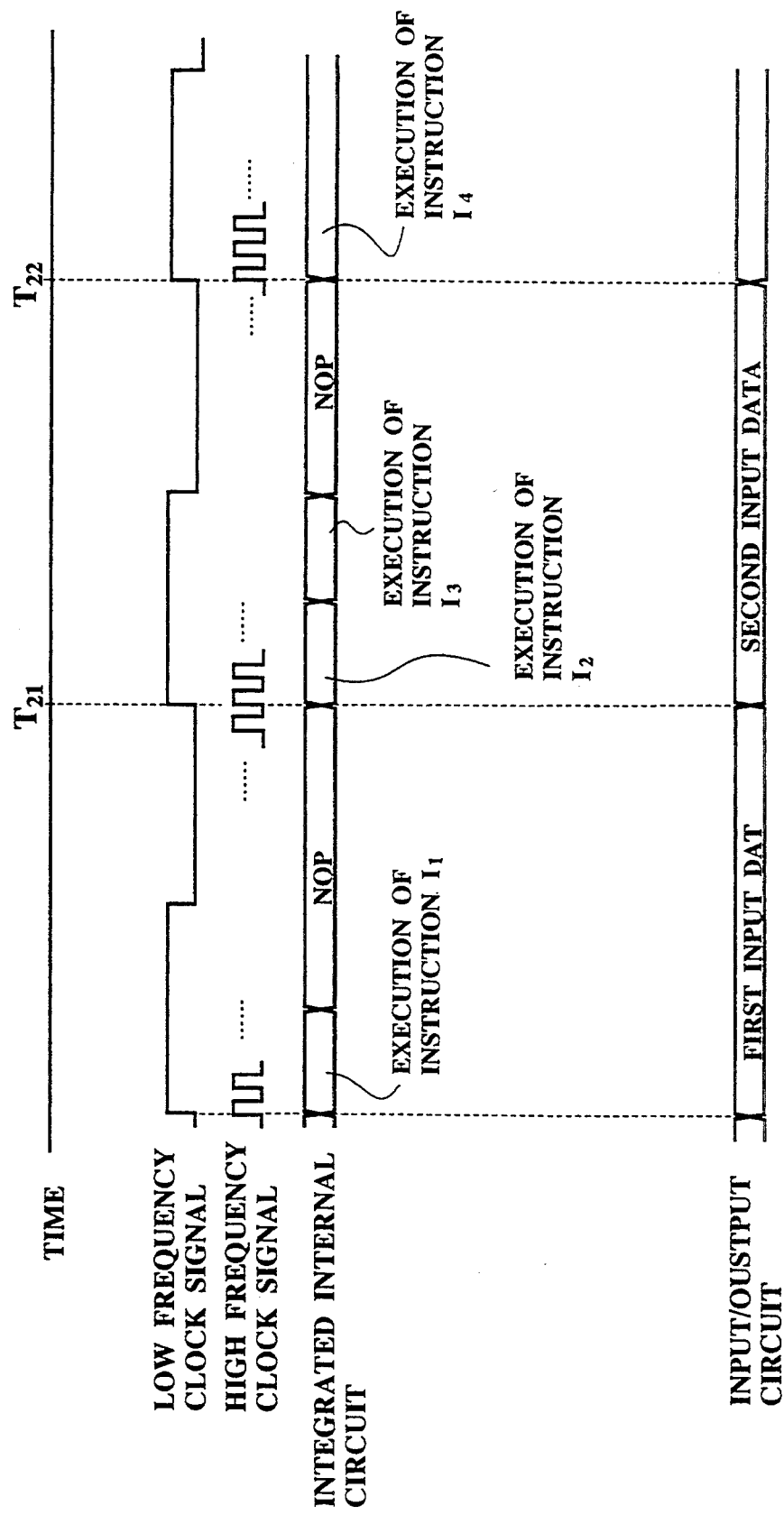
FIG. 9 is a timing chart showing the phase of the slow frequency clock signal during the execution of an instruction executed in synchronization with the high frequency clock signal according to the second embodiment of the present invention.

FIG. 9 is a timing chart showing the phase of the slow frequency clock signal during the execution of an instruction executed in synchronization with the high frequency clock signal according to the second embodiment of the present invention.

The high frequency clock signal is synchronized with the low frequency clock signal. Specifically, the phase of the high frequency clock signal is locked at the leading edge thereof when the phase of the low frequency clock signal is at the leading edge thereof.

As shown in FIG. 9, because a binary digit "1" is provided in the phase designation field of the instructions $I_2$, $I_4$, the execution of the instruction $I_2$ is deferred by inserting a NOP code until the leading edge of the high frequency clock signal agrees with the leading edge of the low frequency clock signal so that the instruction $I_2$ is executed at a time $T_{21}$. Similarly, the execution of the instruction $I_4$ is deferred by inserting a NOP code until the leading edge of the high frequency clock signal agrees with the leading edge of the low frequency clock signal so that the instruction $I_4$ is executed at a time $T_{22}$.

The operational differences between the first and second embodiments are as follows. A programmer can arbitrarily specify the instruction to be executed at a prescribed execution time because the instruction memory 51 is a RAM, while the programmer cannot specify the micro instruction to be executed at a prescribed execution time because the micro instruction memory 42 is a ROM. For example, the programmer can provide the binary digit "1" to an instruction relating to the input operation. Therefore, the input operation can be reliably accomplished at the specific phase of the low frequency clock signal whenever a program consisting of the series of instructions $I_1, I_2, ---$ is executed.

In the second embodiment, when the leading edge of the high frequency clock signal agrees with the leading edge of the low frequency clock signal, the instructions requiring data transfer between the integrated internal and external circuits through the input/output circuit are allowed to be executed. However, the specific phase of the low frequency clock signal is not limited to the above embodiment. That is, it is preferable that an instruction be designated for executing when the phase of the low frequency clock signal agrees with a suitable phase corresponding to the operation executed by the instruction.

Next, an instruction control method according to a third embodiment of the present invention is described.

An instruction memory utilized in the third embodiment is the same as that utilized in the second embodiment as shown in FIG. 8.

Figure 10:
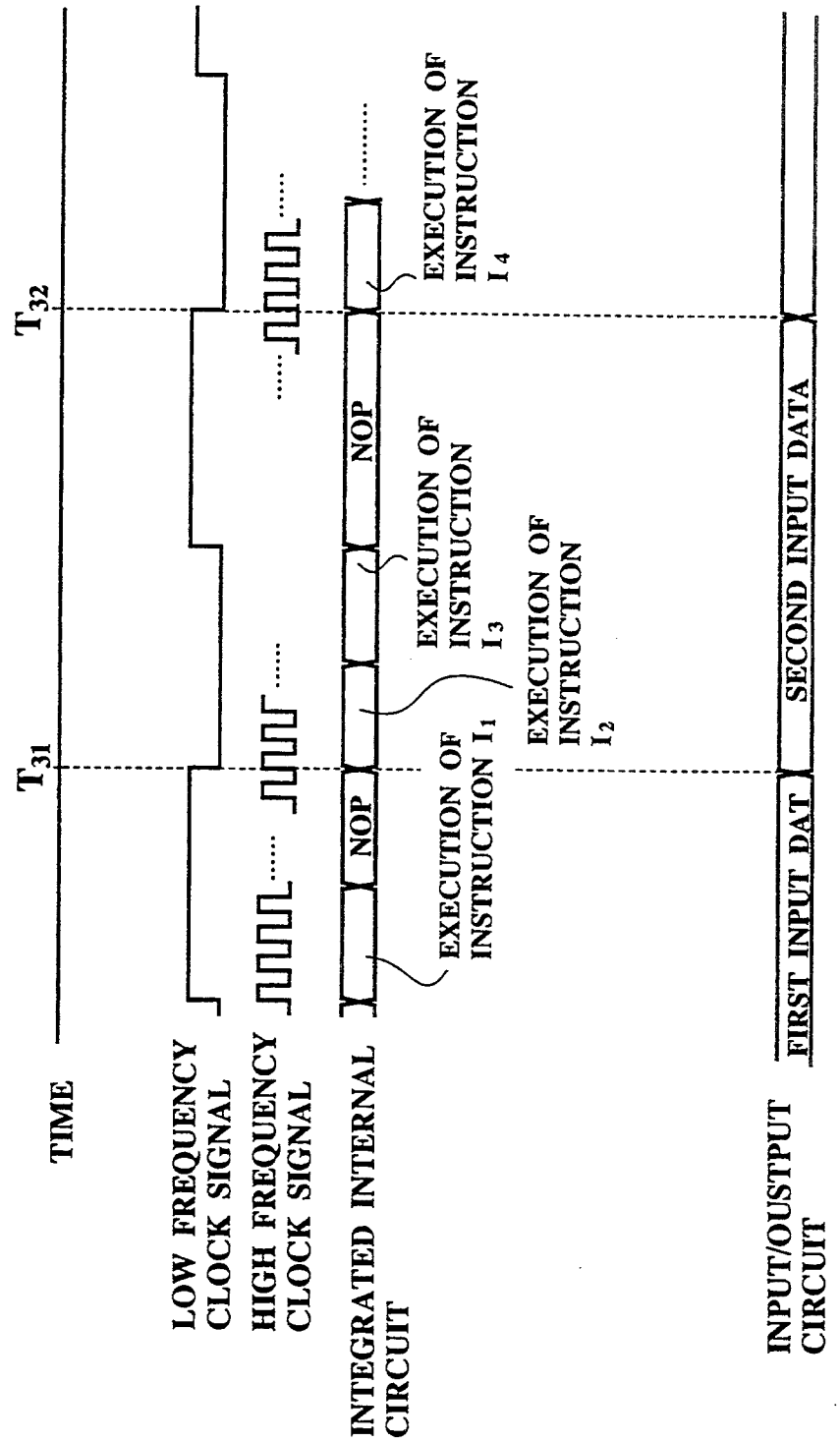
FIG. 10 is a timing chart showing the phase of the low frequency clock signal during the execution of an instruction executed in synchronization with the high frequency clock signal according to a third embodiment of the present invention. invention.

FIG. 10 is a timing chart showing the phase of the low frequency clock signal during the execution of an instruction executed in synchronization with the high frequency clock signal according to the third embodiment of the present invention.

The high frequency clock signal is synchronized with the low frequency clock signal. Specifically, the phase of the high frequency clock signal is locked at the leading edge thereof when the phase of the low frequency clock signal is at a trailing edge thereof.

The difference between the second and third embodiments is as follows.

The specific phase of the low frequency clock signal designated by a binary digit "1" is the trailing edge in the third embodiment, while the specific phase of the low frequency clock signal designated by a binary digit "1" is the leading edge in the second embodiment.

The third embodiment is available when the low frequency clock signal is inverted by a prescribed inverter before the clock signal is transmitted to the input/output circuit.

As shown in FIG. 10, because a binary digit "1" is provided in the phase designation field of the instructions $I_2, I_4$, the execution of the instruction $I_2$ is deferred by inserting a NOP code until the leading edge of the high frequency clock signal agrees with the trailing edge of the low frequency clock signal so that the instruction $I_2$ is executed at a time $T_{31}$. Similarly, the execution of the instruction $I_4$ is deferred by inserting a NOP code until the leading edge of the high frequency clock signal agrees with the trailing edge of the low frequency clock signal so that the instruction $I_4$ is executed at a time $T_{32}$.

Accordingly, a programmer can arbitrarily specify the instruction to be executed at a prescribed execution time because the instruction memory 51 is a RAM, in the same manner as in the second embodiment.

Moreover, the execution of the instruction can be controlled although the low frequency clock signal is inverted by the inverter.

The phase designation field is formed as one bit in the first to third embodiments. However, it is preferable that the phase designation field be formed as a plurality of bits. In this case, many types of specific phases of the low frequency clock signal can be designated to control the execution of the instruction or the micro instruction. In cases where the phase designation field is, for example, formed by two bits, the execution of the instruction (or the micro instruction) can be controlled according to a binary digits "00", "01", "10", and "11" provided in the phase designation field as follows.

(1) "00": The instruction (or the micro instruction) is executed when the leading edge of the high frequency clock signal agrees with the leading edge of the low frequency clock signal.

(2) "01": The instruction (or the micro instruction) is executed when the trailing edge of the high frequency clock signal agrees with the leading edge of the low frequency clock signal.

(3) "10": The instruction (or the micro instruction) is executed in synchronization with the final clock pulse in the high frequency clock signal in one cycle of the low frequency clock signal as shown in FIG. 7.

(4) "11": The instruction (or the micro instruction) is executed in synchronization with the second clock pulse in the high frequency clock signal in one cycle of the low frequency clock signal.

For example, in cases where an instruction is utilized for an input operation, the binary digits "00" are provided in the instruction. In cases where an instruction is utilized for an input operation in a system in which the low frequency clock signal is inverted, the binary digits "01" are provided in the instruction. In cases where an instruction is utilized for an output operation, the binary digits "10" are provided in the instruction. In cases where an instruction is utilized for an output operation in a system in which the low frequency clock signal is inverted, the binary digits "11" are provided in the instruction.

Accordingly, the execution time of the instruction or the micro instruction can be selected from the four types of execution times.

In general, the instruction which is executed with a large number of micro instructions is executed at high speed in a RISC processor or a signal processor in which the program consisting of a series of instructions is read from the RAM. Therefore, each instruction can be executed within one cycle of the high frequency clock signal in those processors.

Accordingly, the instruction control method for controlling the execution of the instruction is substantially the same as the instruction control method for controlling the execution of the micro instruction. That is, the programmer can draw up program consisting of a series of instructions without restraint Just as if the programmer had drawn up a program consisting of a series of micro instructions.

In short, the programmer can reliably accomplish the operation for transferring the data between the integrated internal and external circuits in those processors by controlling the execution of the instruction in the second and third embodiments in the same manner as the instruction control method for controlling the execution of the micro instruction described in the first embodiment.

Next, an instruction control method according to a fourth embodiment of the present invention is described.

Figure 11:
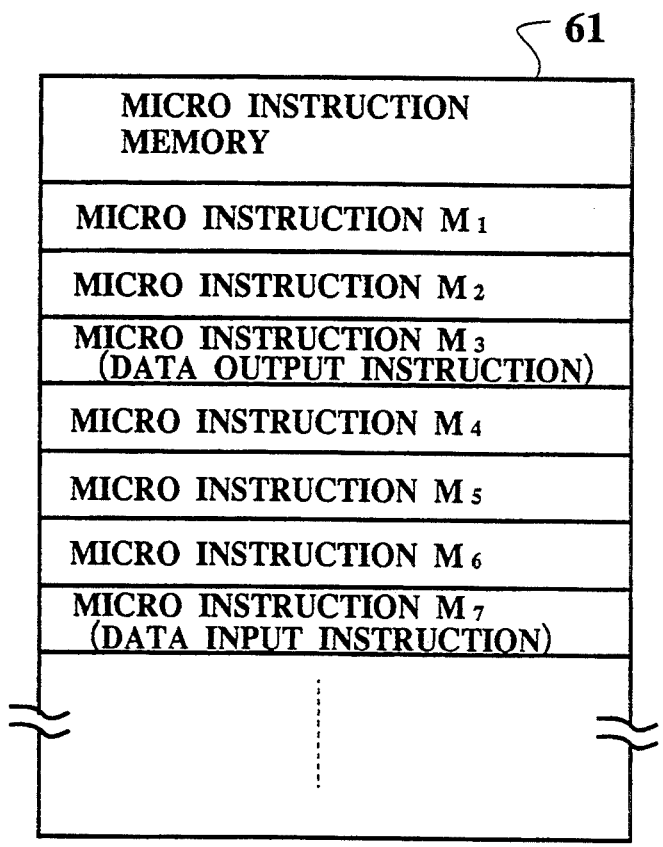
FIG. 11 shows a micro instruction memory according to a fourth embodiment of the present invention.

FIG. 11 shows a micro instruction memory according to the fourth embodiment of the present invention.

The high frequency clock signal is synchronized with the low frequency clock signal. Specifically, the phase of the high frequency clock signal is locked at the leading edge thereof when the phase of the low frequency clock signal is at the leading edge thereof.

The feature of the fourth embodiment is that a key phrase in the micro instruction is detected in a prescribed control circuit in place of the detection of the binary digit in the phase destination field. Therefore, a micro instruction has no phase destination field. The instruction control method which does not utilize a phase destination field is as follows.

The micro instruction requiring the data transfer between the integrated internal and external circuits contains a sentence "output data to the outside of the integrated internal circuit" or a sentence "input data from outside the integrated internal circuit". That is, the phrases "the outside of the integrated internal circuit" and "output" or "input" are necessarily included in the micro instruction requiring data transfer between the integrated internal and external circuits. These phrases are detected in a prescribed control circuit as key phrases before the execution of the micro instruction is started in the integrated internal circuit. That is, when the key phrases "the outside of the integrated internal circuit" and "output" or "input" are detected in the control circuit, the execution of the detected micro instruction is deferred until the phase of the low frequency clock signal agrees with a specific phase. For example, in cases where the detected micro instruction is executed for the input operation, the execution of the detected micro instruction is deferred until the phase of the low frequency clock signal agrees with the leading edge. In cases where the detected micro instruction is executed for the output operation, the execution of the detected micro instruction is synchronized with the final high frequency clock signal in one cycle of the low frequency clock signal.

As shown in FIG. 11, a micro instruction memory 61 is provided with a series of micro instructions $M_1$, $M_2$, - - -. The micro instruction $M_3$ is utilized for the output operation so that the micro instruction $M_3$ contains the sentence "output data to the outside of the integrated internal circuit". The micro instruction $M_7$ is utilized for the input operation so that the micro instruction $M_3$ contains the sentence" input data from outside the integrated internal circuit". The other micro instructions do not require data transfer between the integrated internal and external circuits.

Figure 12:
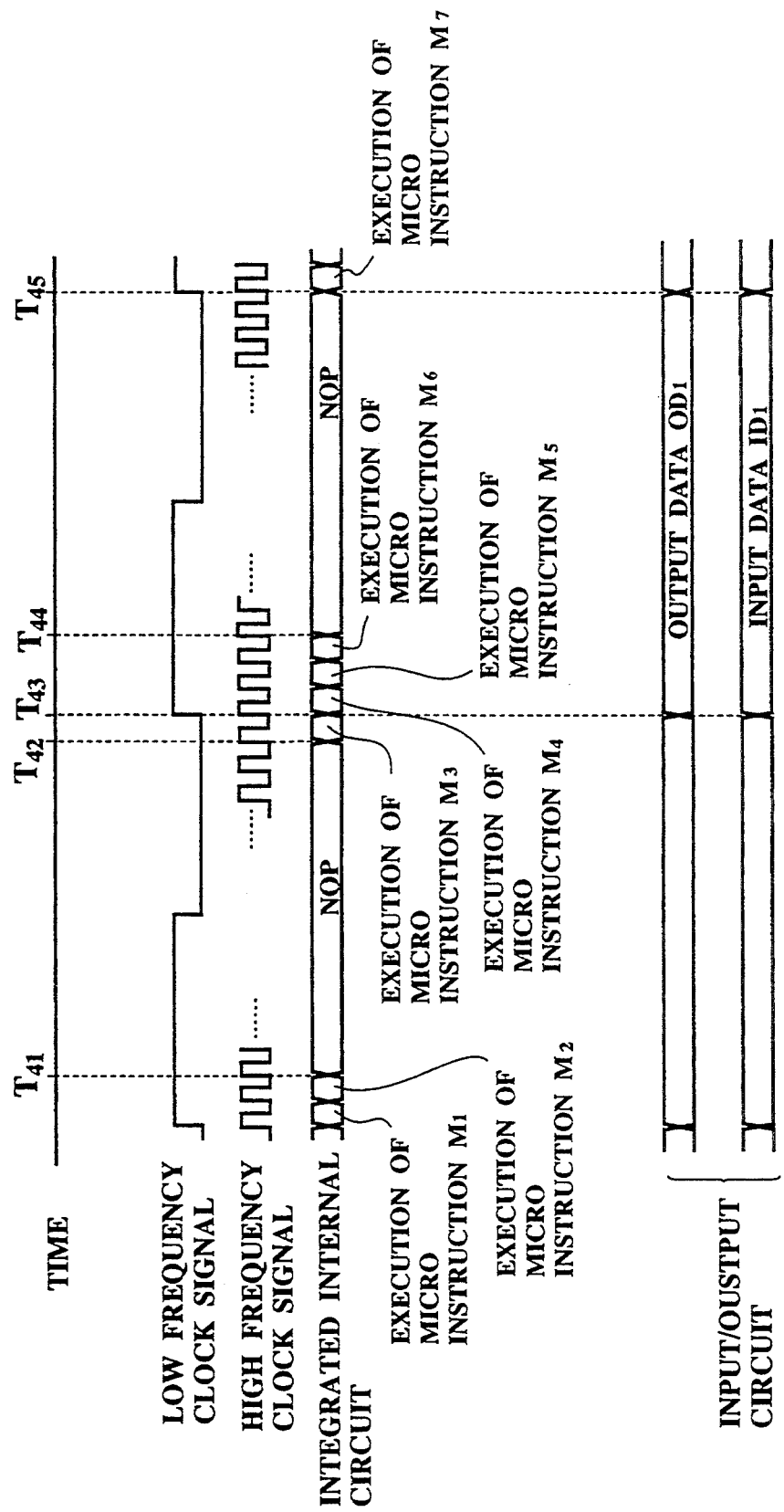
FIG. 12 is a timing chart showing the phase of the slow frequency clock signal during the execution of a micro instruction executed in synchronization with the high frequency clock signal according to the fourth embodiment of the present invention.

FIG. 12 is a timing chart showing the phase of the slow frequency clock signal during the execution of a micro instruction executed in synchronization with the high frequency clock signal according to the fourth embodiment of the present invention.

As shown in FIG. 12, after the micro instructions $m_1$, $m_2$ are executed, the key phrases "the outside of the integrated internal circuit" and "output" are detected in the control circuit at a time $T_{41}$ before the micro instruction $M_3$ is executed in the integrated internal circuit because the micro instruction $M_3$ contains the sentence "output data to the outside of the integrated internal circuit". Therefore, a NOP code is inserted at the time $T_{41}$ after the execution of the micro instructions $M_2$ so that the execution of the micro instruction $M_3$ is deferred until the final high frequency clock signal in one cycle of the low frequency clock signal is provided at a time $T_{42}$. Thereafter, output data $OD_1$ prepared in the integrated internal circuit is transferred to the outside of the circuit at a time $T_{43}$ in synchronization with the low frequency clock signal after the execution of the micro instruction $m_3$ is accomplished.

Simultaneously, the micro instructions $M_4$, $M_5$, $M_6$ are executed in turn. After the execution of the micro instructions $M_4$, $M_5$, $M_6$, the key phrases "the outside of the integrated internal circuit" and "input" are detected in the control circuit at a time $T_{44}$ before the micro instruction $M_7$ is executed in the integrated internal circuit because the micro instruction $M_7$ contains the sentence "input the data from outside the integrated internal circuit". Therefore, a NOP code is inserted at the time $T_{44}$ after the execution of the micro instructions $M_6$ so that the execution of the micro instruction $M_7$ is deferred until the phase of the low frequency clock signal agrees with the leading edge at a time $T_{45}$. Thereafter, input data $ID_1$ prepared outside of the integrated internal circuit is fetched in the circuit at the time $T_{45}$ in synchronization with the low frequency clock signal by executing the micro instruction $M_7$.

In the fourth embodiment, the key phrases in the micro instruction are detected in the control circuit. However, it is preferable that the key phrases in the instruction be detected in the control circuit.

Accordingly, the execution of the instructions or the micro instructions executed in the integrated internal circuit in synchronization with the high frequency clock signalwith a frequency larger than that of the low frequency clock signal with which data signals transferred between the integrated internal and external circuits are synchronized, can be deferred until the phase of the low frequency clock signal agrees with a specific phase. Therefore, data transfer between the integrated internal and external circuits is reliably accomplished although the top instruction of a program consisting of a series of instructions is executed at any step.

Next, an embodiment of an instruction control apparatus according to the present invention is described.

Figure 13:
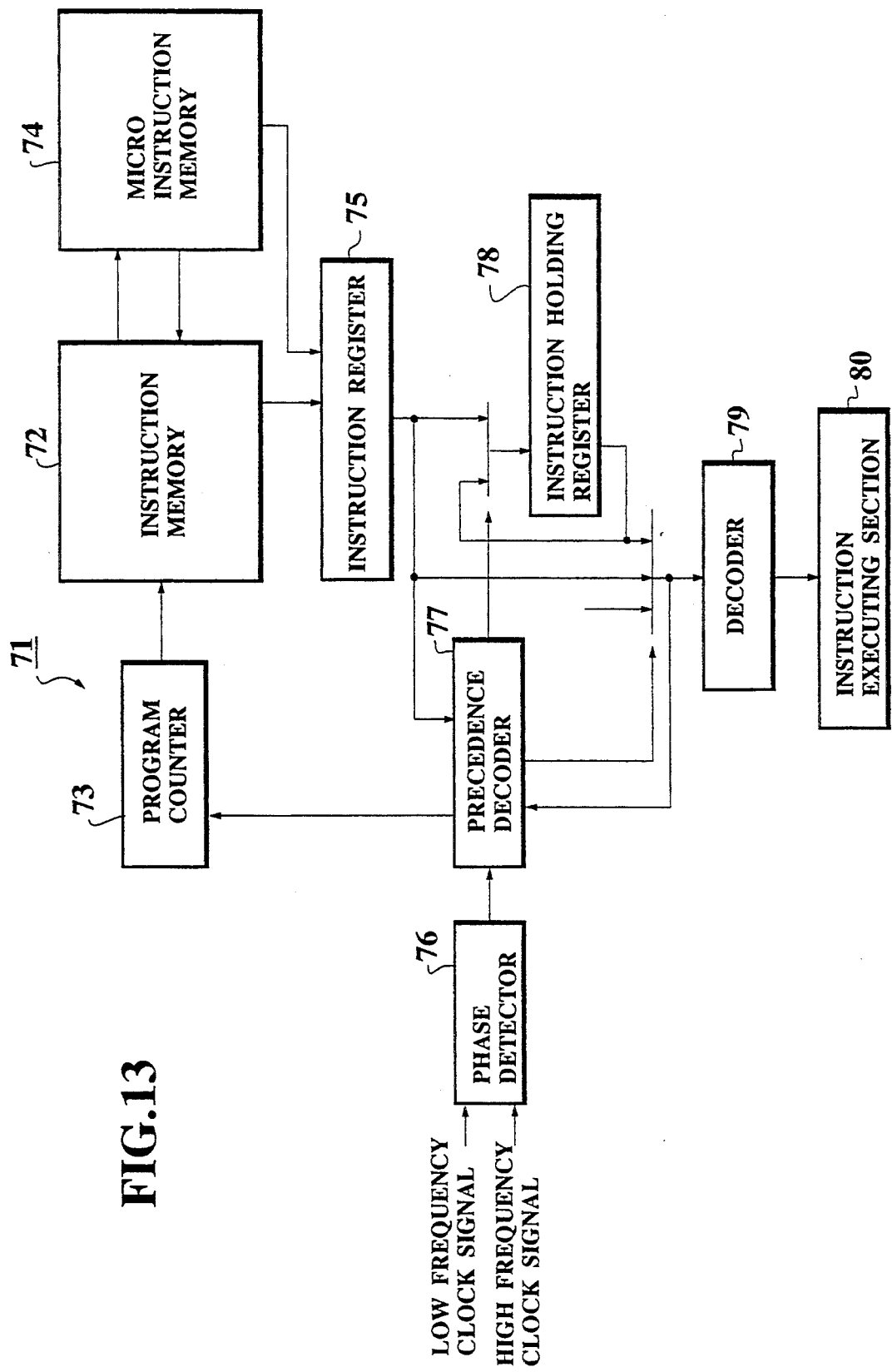
FIG. 13 is a block diagram of an instruction control apparatus according to an embodiment of the present invention.

FIG. 13 is a block diagram of an embodiment of an instruction control apparatus according to the present invention.

The instruction control apparatus shown in FIG. 13 is provided to implement the instruction control method according to both the second and third embodiments of the present invention.

As shown in FIG. 18, an instruction control apparatus 71 for controlling instructions executed in an integrated internal circuit in synchronization with a leading edge of a high frequency clock signal with a frequency larger than that of a low frequency clock signal with which a data signal transferred between the integrated internal circuit and an integrated external circuit disposed at the outside of the integrated internal circuit is synchronized, comprises:

an instruction memory 72 for storing a series of instructions with a phase designation field, a specific phase of the low, frequency clock signal being designated by a binary digit "1" provided in the phase designation field and no phase of the low frequency clock signal being designated by a binary digit "0" provided in the phase designation field;

a program counter 73 for designating an address of an instruction stored in the instruction memory 72, the designated instruction being executed under the control of a prescribed controller (not shown);

a micro instruction memory 74 for storing a series of micro instructions which are executed on the execution of a corresponding instruction stored in the instruction memory 72, the micro instructions being executed for each instruction to designate transmission routes for data signals transferred in the integrated internal circuit or between the integrated internal and external circuits;

an instruction register 75 for storing the instruction for which the address is designated by the program counter 73 after the instruction is read out from the instruction memory 72;

a phase detector 76 for detecting a phase of the low frequency clock signal at the leading edge of the high frequency clock signal after receiving the high and low frequency clock signals;

a precedence decoder 77 for judging whether or not the binary digit provided in the phase designation field of the instruction stored in the instruction register 75 is "1" and whether or not the phase of the low frequency clock signal detected in the phase detector 76 agrees with the specific phase designated by a binary digit "1" provided in the phase designation field of the instruction and for controlling the execution time of the instruction stored in the instruction register 75;

an instruction holding register 78 for holding the instruction stored in the instruction register 75 under the control of the precedence decoder 77 in cases where the precedence decoder 77 judges that the binary digit provided in the phase designation field of the instruction is "1" and the phase of the low frequency clock signal detected in the phase detector 76 differs from the specific phase of the low frequency clock signal;

a decoder 79

(1) for receiving the instruction stored in the instruction register 75 under the control of the precedence decoder 77 in cases where the precedence decoder 77 judges that the binary digit provided in the phase designation field of the instruction is "0" and in cases where the precedence decoder 77 judges that the binary digit provided in the phase designation field of the instruction is "1" and the phase of the low frequency clock signal detected in the phase detector 76 agrees with the specific phase of the low frequency clock signal, (2) for receiving a NOP code under the control of the precedence decoder 77 in cases where the precedence decoder 77 judges that the binary digit provided in the phase designation field of the instruction is "1" and the phase of the low frequency clock signal detected in the phase detector 76 differs from the specific phase of the low frequency clock signal, (3) for receiving the instruction held in the instruction holding register 78 under the control of the precedence decoder 77 when the precedence decoder 77 judges that the phase of the low frequency clock signal detected in the phase detector 76 agrees with the specific phase of the low frequency clock signal when some time has elapsed after the instruction is held in the instruction holding register 78 in cases where the binary digit provided in the phase designation field of the instruction is "1", and (4) for decoding the received NOP code or instruction; and an instruction executing section 80 for executing the NOP code or the instruction decoded in the decoder 79.

In the above configuration of the instruction control apparatus 71, the instruction stored in the address of the instruction memory 72 designated by the program counter 73 is stored in the instruction register 75.

Thereafter, the instruction stored in the instruction register 75 is provided to the precedence decoder 77 so that the binary digit provided in the phase designation field of the instruction is judged by the precedence decoder 77. Simultaneously, the phase of the low frequency clock signal at the leading edge of the high frequency clock signal is provided to the precedence decoder 77 from the phase detector 76.

Therefore, three types of operations are implemented according to both the binary digit and the phase of the low frequency clock signal in the precedence decoder 77 as follows.

(1) The instruction stored in the instruction register 75 is directly provided to the decoder 79 in cases where the precedence decoder 77 judges the binary digit provided in the phase designation field of the instruction to be "0" so that no phase of the low frequency clock signal is designated.

(2) The instruction stored in the instruction register 75 is provided in the instruction holding register 78 while providing the NOP code to the decoder 79 in cases where the precedence decoder 77 judges the binary digit provided in the phase designation field of the instruction to be "1" so that the specific phase of the low frequency clock signal is designated and the phase of the low frequency clock signal detected in the phase detector 76 differs from the specific phase of the low frequency clock signal. Simultaneously, the operation of the program counter 73 is suspended. Thereafter, when the phase of the low frequency clock signal agrees with the specific phase of the low frequency clock Signal as time elapses, the instruction held in the instruction holding register 78 is provided to the decoder 79. At this time, the operation of the program counter 73 is resumed.

(3) The instruction stored in the instruction register 75 is directly provided to the decoder 79 in cases where the precedence decoder 77 judges the binary digit provided in the phase designation field of the instruction to be "1" and the phase of the low frequency clock signal detected in the phase detector 76 agrees with the specific phase of the low frequency clock signal.

Thereafter, either the instruction or the NOP code provided to the decoder 79 is decoded to be executed in the instruction executing section 80. That is, either an operation such as a calculation is implemented in the integrated internal circuit or an operation such as the transfer of the data signal between the integrated internal and external circuits is implemented by the execution of the instruction.

Accordingly, the instruction executed in synchronization with the leading edge of the high frequency clock signal can be executed in synchronization with the specific phase of the low frequency clock signal by providing the phase designation field in the instruction. That is, the execution time of the instruction can be arbitrarily controlled. Therefore, data transfer between the integrated internal and external circuits is reliably accomplished although the top instruction of a program consisting of a series of instructions is executed at any step.

In the instruction control apparatus 71 shown in FIG. 13, the instruction for which the address is designated by the program counter 73 is stored in the instruction register 75. However, it is preferable that the micro instruction executed by the execution of the instruction be stored in the instruction register 75 after the micro instruction is read out from the micro instruction memory 74. In this case, the phase destination field is provided in the micro instruction so that the precedence decoder 77 detects the binary digit provided in the phase destination field of the micro instruction.

Therefore, the instruction control method according to the first embodiment of the present invention can be realized in the same manner as in the second and third embodiments.

Moreover, the instruction is provided with the phase destination field in the instruction control apparatus 71 shown in FIG. 13. However, it is preferable that the instruction be provided with no phase destination field and the precedence decoder 77 detect a key phrase in the instruction such as "the outside of the integrated internal circuit", "input", or "output" in place of the detection of the binary digit provided in the phase destination field of the instruction.

Therefore, the instruction control method according to the fourth embodiment of the present invention can be implemented in the same manner as in the first to third embodiments.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An instruction control method for controlling execution of an instruction in synchronization with a first clock signal which is in synchronism with timing of an internal circuit, said first clock signal having a frequency greater than that of a second clock signal which is in synchronism with timing of an external circuit, where said first clock signal is synchronous with said second clock signal and a specific phase occurs between the first clock and second clock signal once in n times, where n is an integer greater than two the method comprising the steps of:
    storing phase information which designates said specific phase of the second clock signal, said specific phase being either a rising edge or a falling edge of said second clock signal;
    deferring the execution of a specific instruction which is synchronized with the first clock signal until the phase of the first clock signal agrees with said specific phase of the second clock signal designated by the phase information stored in said storing step; and
    executing the specific instruction when the phase of the second clock signal agrees with the specific phase designated by the stored phase information.

2. A method according to claim 1 in which the specific instruction deferred in said deferring step is an instruction for transferring a data signal between the internal circuit and the external circuit.

3. A method according to claim 1 in which a data signal is transferred between the internal circuit and the external circuit when the phase of the second clock signal agrees with the specific phase designated by the stored phase information.

4. A method according to claim 1 in which the specific instruction is executed to transfer a data signal between the internal circuit and the external circuit in synchronization with the specific phase of the second clock signal.

5. A method according to claim 1 in which the specific instruction is executed to output a data signal from the internal circuit to the external circuit when the phase of the second clock signal agrees with the specific phase.

6. A method according to claim 1 in which the specific instruction is executed to fetch a data signal in the internal circuit from the external circuit when the phase of the second clock signal agrees with the specific phase.

7. A method according to claim 1 in which the specific instruction is specified by a field pattern.

8. A method according to claim 1 in which the specific instruction is a micro instruction executed with one cycle of the first clock signal.

9. A method according to claim 1 in which a no operation instruction is inserted during deferring of execution of the specific instruction.

10. An instruction control apparatus for controlling execution of an instruction executed in synchronization with a first clock signal which is in synchronism with the timing of an internal circuit, said first clock signal having a frequency greater than that of a second clock signal which is in synchronism with the timing of an external circuit, where said first clock signal is synchronous with said second clock signal and a specific phase occurs between the first clock and second clock signals once in n times, where n is an integer greater than two the apparatus comprising:
    means for storing phase information which designated said specific phase of the second clock signal, said specific phase being either a leading edge or a falling edge of said second clock signal;
    means for deferring the execution of a specific instruction which is synchronized with the first clock signal until the phase of the first clock signal agrees with the specific phase of the second clock signal designated by the phase information stored in said storing means; and
    means for executing the specific instruction when the phase of the second clock signal agrees with the specific phase designated by the phase information stored in said storing means.

11. An apparatus according to claim 10 in which the specific instruction is an instruction for transferring a data signal between the internal circuit and the external circuit.

12. An apparatus according to claim 10 in which a data signal is transferred between the internal circuit and the external circuit when the phase of the second clock signal agrees with the specific phase designated by the phase information stored in the storing means.

13. An apparatus according to claim 10 in which the specific instruction is executed to transfer a data signal between the internal circuit and the external circuit in synchronization with the specific phase of the second clock signal designated by the phase information stored in said storing means.

14. An apparatus according to claim 10 in which the specific instruction is executed to output a signal from the internal circuit to the external circuit when the phase of the second clock signal agrees with the specific phase designated by the phase information stored in said storing means.

15. An apparatus according to claim 10 in which the specific instruction is executed to fetch a data signal in the internal circuit from the external circuit when the phase of the second clock signal agrees with the specific phase designated by the phase information stored in said storing means.

16. An apparatus according to claim 10 in which the specific instruction is specified by a field pattern.

* * * * *